UNITED STATES PATENT OFFICE.

JEAN LOEWENTHAL, OF MAGDEBURG, GERMANY, ASSIGNOR TO THE QUARZITOL COMPANY, OF NEW YORK, N. Y.

COMPOSITION FOR MAKING STONES OR MORTAR.

SPECIFICATION forming part of Letters Patent No. 707,129, dated August 19, 1902.

Application filed May 23, 1902. Serial No. 108,736. (No specimens.)

*To all whom it may concern:*

Be it known that I, JEAN LOEWENTHAL, architect, a subject of the King of Prussia, German Emperor, residing at 2 Jakobstrasse, Magdeburg, Germany, have invented a new and useful Improvement in Compositions for Making Stones or Mortar, of which the following is a specification.

My invention relates to the process of making a stone or mortar composition which can be equally well used for all technical purposes and also seems especially suitable for trade art-works. By reason of its peculiar composition it is hard but not brittle, of great compressive strength, and can therefore be cut with saw or hewn with chisel. It possesses a slight porosity, but is absolutely not water-absorbing. It is quite frost-free and can be used as mortar at a temperature of 40° Celsius. As mortar it cements with every other material, stones of every kind, even with wood and iron, and can be nailed without the iron being destroyed by rust. It is water and fire proof and can be highly polished. The process of making it is very cheap and all waste parts can be used again.

Compared to the known process of making art-stones, which always have chalk, plaster, cement, or clay as their principal part, in this composition the only material used is fine clean quartz sand, which can be contained in the composition up to ninety parts, and this is mixed with pulverized quartz to fill out the spaces. To this clean quartz material a quantity of alunite is added, which by reason of its affinity with quartz favors the combination of the small parts in the composition. As a cementing material magnesia is added, which is known as suitable for this purpose, and by an addition of borax, both materials used in a cold and dry manner, the cementing power is increased. All materials are mechanically well mingled in a dry cold way and receive besides an addition of graphite. This is to cause the mixture more suitable to receive the to-be-mingled mineral oil, poor in carbureted hydrogen, therefore not combustible, which takes place shortly before its use as mortar or for the making of stones. The composition is then of a dough-like consistency and is then made fit for the desired purpose by a small addition of water. The forming of articles—for instance, stones—takes place without using heat or pressure. The density of its grain may be considerably increased by the help of presses like those used in the clay industry.

A composition for the purpose of using as mortar of a good effect can, for example, be made as follows: Fine clean quartz sand, eighty-five pounds; pulverized quartz, four pounds; alunite, one-half pound; magnesia, one pound; borax, two pounds; graphite, one-half pound; mineral colors, two pounds; then shortly before use mineral oil, poor in carbureted hydrogen, one-half gallon; then water, one-fourth gallon.

I am aware that a composition consisting of but small quantities of quartz sand, mixed with lime, cement, plaster, or the like, magnesia, borax, mineral colors, and water has been used for producing stones and that also oily substances—for example, petroleum and paraffin—have been added; but I am not aware that quartz as the principal part has been used, nor the addition of graphite, alunite, and an oil poor in carbureted hydrogen, and therefore not combustible, is known elsewhere, and all the ingredients of my composition have not been mixed together.

What I do claim as my invention, and desire to secure by Letters Patent, is—

1. The herein-described composition of matter consisting of clean quartz sand, pulverized quartz, alunite, magnesia, borax, graphite, mineral oil, poor in carbureted hydrogen, and water, substantially as described and for the purpose specified.

2. The herein-described composition of matter consisting of clean quartz sand eighty-five pounds, pulverized quartz four pounds, alunite one-half pound, magnesia one pound, borax two pounds, graphite one-half pound, mineral colors two pounds, mineral oil poor in carbureted hydrogen one-half gallon, and water one-fourth gallon, substantially as described.

In witness whereof I have hereunto set my hand in presence of two witnesses.

JEAN LOEWENTHAL.

Witnesses:
L. PALMER,
ERICK PETERS.